US011267907B2

(12) United States Patent
Brita et al.

(10) Patent No.: US 11,267,907 B2
(45) Date of Patent: *Mar. 8, 2022

(54) PROCESS FOR THE PREPARATION OF CATALYST COMPONENTS FOR THE POLYMERIZATION OF OLEFINS

(71) Applicant: BASELL POLIOLEFINE ITALIA S.R.L., Milan (IT)

(72) Inventors: Diego Brita, Ferrara (IT); Nicolo Arich De Finetti, Ferrara (IT); Ofelia Fusco, Ferrara (IT); Benedetta Gaddi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 95 days.

This patent is subject to a terminal disclaimer.

(21) Appl. No.: 16/647,766

(22) PCT Filed: Sep. 7, 2018

(86) PCT No.: PCT/EP2018/074086
§ 371 (c)(1),
(2) Date: Mar. 16, 2020

(87) PCT Pub. No.: WO2019/052900
PCT Pub. Date: Mar. 21, 2019

(65) Prior Publication Data
US 2020/0231716 A1 Jul. 23, 2020

(30) Foreign Application Priority Data
Sep. 15, 2017 (EP) .................................... 17191417

(51) Int. Cl.
*C08F 4/654* (2006.01)
*C08F 4/655* (2006.01)
*C08F 10/06* (2006.01)
*C08F 4/659* (2006.01)

(52) U.S. Cl.
CPC .......... *C08F 4/65916* (2013.01); *C08F 4/654* (2013.01); *C08F 4/655* (2013.01); *C08F 10/06* (2013.01)

(58) Field of Classification Search
CPC .................................................... C08F 4/654
See application file for complete search history.

(56) References Cited

U.S. PATENT DOCUMENTS

| 5,188,997 A | * | 2/1993 | Luciani | .................. | C08F 10/02 502/107 |
| 6,165,928 A | * | 12/2000 | Luciani | .................. | C08F 10/00 502/104 |
| 2006/0252636 A1 | | 11/2006 | Vizzini et al. | | |

FOREIGN PATENT DOCUMENTS

| CN | 1060476 A | 4/1992 |
| CN | 101134790 A | 3/2008 |
| CN | 101189272 A | 5/2008 |
| EP | 2065087 A1 | 6/2009 |
| EP | 2251361 A1 | 11/2010 |
| JP | H0625331 A | 2/1994 |
| JP | H09110916 A | 4/1997 |
| JP | 2007505955 A | 3/2007 |
| JP | 2016501934 A | 1/2016 |
| RU | 2054434 C1 | 2/1996 |
| RU | 2345093 C2 | 1/2009 |
| WO | 2009097398 A1 | 8/2009 |
| WO | 2011061134 A1 | 5/2011 |
| WO | 2018210665 A1 | 11/2018 |

OTHER PUBLICATIONS

International Search Report and Written Opinion dated Dec. 7, 2018 for Corresponding PCT/EP2018/074086.

* cited by examiner

*Primary Examiner* — Caixia Lu

(57) ABSTRACT

A process for the preparation of a solid catalyst component for the polymerization of $CH_2$=CHR olefins, wherein R is hydrogen or hydrocarbyl radical with 1-12 carbon atoms, made from or containing a Ti compound on a Mg chloride based support, including the steps of (a) reacting a Mg based compound with a liquid medium made from or containing a Ti compound, at a temperature ranging from 0 to 150° C., thereby yielding solid particles; and (b) suspending the solid particles coming from step (a) in a liquid medium made from or containing hydrocarbons at a temperature ranging from 10 to 100° C., wherein step (a) or (b) is carried out in the presence of 0.2 to 20.0% by weight, with respect to the amount of Mg compound, of particles of a solid compound containing more than 50% by weight of $SiO_2$ units and having average particle size from 1 to 100 μm.

16 Claims, No Drawings

PROCESS FOR THE PREPARATION OF CATALYST COMPONENTS FOR THE POLYMERIZATION OF OLEFINS

FIELD OF THE INVENTION

In general, the present disclosure relates to the field of chemistry. More specifically, the present disclosure relates to polymer chemistry. In particular, the present disclosure relates to a process for the preparation of Ziegler-Natta catalyst components for the homopolymerization or copolymerization of olefins.

BACKGROUND OF THE INVENTION

In some instances, Ziegler-Natta catalyst for the polymerization of olefins is made from or containing a solid catalyst component. The solid catalyst component is prepared with a titanium compound and optionally an internal electron donor compound and supported on a magnesium dihalide. The solid catalyst component is activated by an Al-alkyl compound. In some instances, the Al-alkyl compound is in liquid form.

In some instances, the preparation of the solid catalyst component includes one or more steps wherein a Mg compound is reacted with a titanium compound in the optional presence of an electron donor compound. In some instances, the Mg compound is magnesium dichloride or its precursor. At the end, the catalytic solid is washed with liquid hydrocarbons and dried.

In some instances, the reaction and washing stages are carried out in a slurry obtained by suspending a solid in an excess of a liquid phase. In some instances, the liquid phase is made from or containing a liquid titanium compound, a liquid hydrocarbon, or both. In the slurry stages, the liquid is separated from the resulting solid catalyst precursor in each successive step. It is believed that a shorter removal time can increase productivity and minimize contact between the products and by-products.

In some instances and when the slurry step is carried out at a relatively high temperature, some ingredients are affected by degradation problems. In these cases, it is believed that fast removal of the liquid phase would minimize the degradation process and produce a more reliable catalyst.

SUMMARY OF THE INVENTION

In a general embodiment, the present disclosure provides a process for the preparation of a solid catalyst component for the homopolymerization or copolymerization of $CH_2$=CHR olefins, wherein R is hydrogen or hydrocarbyl radical with 1-12 carbon atoms, made from or containing a Ti compound and optionally an electron donor on a Mg chloride based support, including the steps of (a) reacting a Mg based compound of formula $(MgCl_mX_{2-m}) \cdot nLB$, wherein m ranges from 0 to 2, n ranges from 0 to 6, X is, independently halogen, $R^1$, $OR^1$, —$OCOR^1$ or O—C(O)—$OR^1$ group, wherein $R^1$ is a $C_1$-$C_{20}$ hydrocarbon group, and LB is a Lewis base, with a liquid medium made from or containing a Ti compound, having at least a Ti—Cl bond, in an amount such that the Ti/Mg molar ratio is greater than 3, at a temperature ranging from 0 to 150° C., thereby yielding solid particles; and (b) suspending the solid particles coming from step (a) in a liquid medium made from or containing hydrocarbons at a temperature ranging from 10 to 100° C., wherein step (a) or step (b) is carried out in the presence of 0.2 to 20.0% by weight, with respect to the amount of Mg compound, of particles of a solid compound containing more than 50% by weight of $SiO_2$ units and having average particle size ranging from 1 to 100 μm. In some embodiments, the average particle size ranges from 1 to 30 μm.

DETAILED DESCRIPTION OF THE INVENTION

In some embodiments, the solid compound containing more than 50% by weight of $SiO_2$ units is selected from the group consisting of silica, silicates and diatomaceous earth. In some embodiments, the silicates are phyllosilicates. In some embodiments, the phyllosilicate is talc. In some embodiments, the silica is a hydrophilic silica, that is, a silica that has not been modified to become hydrophobic. In some embodiment, the solid compound is diatomaceous earth. In some embodiments, the diatomaceous earth is available commercially under the name Celite®.

In some embodiments, the amount of solid compound containing more than 50% by weight of $SiO_2$ units ranges from 0.5 to 10% by weight, alternatively from 0.5 to 5% by weight with respect to the amount of Mg compound in step (a).

In some embodiments, the solid compound containing more than 50% by weight of $SiO_2$ units is present in step (a).

As used herein, the term "average particle size" is defined as the P50 value obtained from procedure described in the experimental section. The procedure is carried out on powder samples free from aggregates, which samples were obtained by subjecting the powder to ultrasound treatment.

In some embodiments, step (a) is carried out by suspending the solid compound containing more than 50% by weight of $SiO_2$ units, and the Mg compound in the liquid medium made from or containing a titanium compound of formula $Ti(OR^1)_{q-y}Cl_y$, where q is the valence of titanium, y is a number between 1 and q and $R^1$ is a $C_1$-$C_{20}$ hydrocarbon group.

In some embodiments, the titanium compounds are selected from the group consisting of titanium polyhalogenated compounds such as titanium tetrahalides or halogenalcoholates. In some embodiments, the titanium compounds are selected from the group consisting of $TiCl_4$ and $Ti(OEt)Cl_3$.

In some embodiments, the liquid medium made from or containing the Ti compound is a mixture of the Ti compound in another liquid diluent. In some embodiment, the diluents are hydrocarbons, optionally chlorinated, that are liquid at room temperature. In some embodiments, the liquid medium is made from or contains the liquid titanium compound.

In some embodiments, the magnesium based compound used as a starting compound in step (a) is selected among adducts of the formula $MgCl_2 \cdot nR^1OH$, where n is a number between 0.1 and 6, and $R^1$ is a hydrocarbon radical having 1-18 carbon atoms. In some embodiments, n ranges from 1 to 5, alternatively from 1.5 to 4.5. In some embodiments, $R^1$ is ethyl.

In some embodiments, the adduct is prepared by mixing alcohol and magnesium chloride, operating under stirring conditions at the melting temperature of the adduct (100-130° C.). Then, the adduct is mixed with an inert hydrocarbon immiscible with the adduct, thereby creating an emulsion which is quickly quenched, causing the solidification of the adduct in the form of spherical particles. In some embodiments, the spherical adducts are prepared as described in U.S. Pat. No. 4,399,054 or 4,469,648.

In some embodiment, the method for the spherulization is the spray cooling method described in U.S. Pat. No. 5,100,849 or 4,829,034. In some embodiments, the adducts having the final alcohol content are obtained by directly using the selected amount of alcohol during the adduct preparation.

In some embodiments, the adduct is directly reacted with a Ti compound. In some embodiments, the adduct is subjected to thermal controlled dealcoholation (80-130° C.), thereby obtaining an adduct wherein the number of moles of alcohol is lowered and the adduct's porosity is increased. In some embodiments and when the dealcoholation is carried out, the number of moles of alcohol per mole of Mg is reduced to less than 3, alternatively to between 0.1 and 2.5.

In some embodiments, the reaction between the Mg based compound and the Ti compound is carried out by suspending the Mg based compound and the solid compound containing more than 50% by weight of $SiO_2$ units in large excess of cold $TiCl_4$. In some embodiments, the $TiCl_4$ has a temperature of 0° C. In some embodiments, the Mg based compound is a $MgCl_2$-alcohol adduct. The mixture is heated up to a temperature ranging from 60-140° C. and kept at this temperature for 0.1-4 hours, alternatively 0.5-2 hours. In some embodiments, the reaction occurs at the elevated temperature.

After the reaction time has ended, stirring in step (a) is discontinued and the solid particles are allowed to settle. After the settling is complete, the liquid phase is removed. In some embodiments, complete settling is indicated by the liquid phase above the solid phase becoming clear. In some embodiments, determination of the amount of light passing through the liquid phase using light detectors indicates complete settling. When the amount of light passing through the liquid phase plateaus, the settling process is complete. In some embodiments and for dark suspensions, the liquid phase is siphoned at the same height from the bottom of the reactor and the amount of solid particles removed with the liquid is determined. When the amount is negligible, the settling is considered complete. It is believed that the use of the solid compound containing more than 50% by weight of $SiO_2$ units facilitates reaching the lowest amount of solid particles removed with the liquid in a shorter time.

In some embodiments, the reaction step (a) is repeated one or more times under identical or different conditions. In some embodiments, the temperature or the duration of treatment is changed. In some embodiments, the number of steps (a) is between 1 and 4, alternatively between 1 and 3.

In some embodiments and in repeating step (a), fresh solid compound containing more than 50% by weight of $SiO_2$ units is added. In some embodiments, the compound is added in the first of a series of step (a) and not in step (b).

In some embodiments, the electron donor compound is added during one or more of the reaction steps (a) between the Mg based compound and the liquid Ti compound.

In some embodiments, the electron donor compound is added at least during the first step (a) of the reaction between the Mg based compound and the Ti compound. In some embodiments, the treatment is repeated one or two additional times.

In some embodiments and as described in Patent Cooperation Treaty Publication No. WO2004/106388, the electron donor compound is added as a fresh reactant to the solid intermediate catalyst component obtained by the reaction between the adduct and the Ti compound.

In some embodiments and at the end of the last step (a), the solid catalyst component is subjected to step (b) including washings with hydrocarbon solvents. In some embodiments, the washings occur until chloride ions are no longer detectable by potentiometric titration.

The resulting solid is suspended in the hydrocarbon solvent and stirred at a temperature ranging from 10 to 100° C. for a period of time ranging from 1 minute to 1 hour. In some embodiments and if not added in step (a), the solid compound containing more than 50% by weight of $SiO_2$ units is added, with the same methodology and amount, in step (b).

In some embodiments, the particles of the final solid catalyst component have a spherical morphology and an average diameter ranging between 5 and 150 μm, alternatively from 20 to 100 μm, alternatively from 30 to 90 μm. As used herein, "particles having spherical morphology" indicates that the particles have the ratio between the greater axis and the smaller axis equal to or lower than 1.5, alternatively lower than 1.3.

In some embodiments, the amount of Mg ranges from 8 to 30% by weight, alternatively from 10 to 25% by weight with respect to the total weight of solid catalyst component.

In some embodiments, the amount of Ti ranges from 0.5 to 5% by weight, alternatively from 0.7 to 3% by weight with respect to the total weight of solid catalyst component.

In some embodiments, the internal electron donor is selected from the group consisting of ethers, amines, silanes, carbamates, ketones, esters of aliphatic acids, alkyl and aryl esters of optionally substituted aromatic mono or polycarboxylic acids, diol derivatives chosen among monoester monocarbamates and monoester monocarbonates, or mixtures thereof.

In some embodiments, the internal donor is selected from alkyl and aryl esters of optionally substituted aromatic polycarboxylic acids while donors are the esters of phthalic acids. In some embodiments, esters of aliphatic acids are selected from the group consisting of malonic, glutaric, maleic and succinic acids. In some embodiment, the esters are selected from the group consisting of n-butylphthalate, di-isobutylphthalate, and di-n-octylphthalate.

In some embodiments, the ethers are selected from the group consisting of 1,3 diethers of the formula (I):

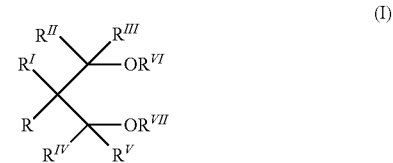

(I)

wherein $R$, $R^I$, $R^{II}$, $R^{III}$, $R^{IV}$ and $R^V$ are equal to or different from each other, and are hydrogen or hydrocarbon radicals having from 1 to 18 carbon atoms; and $R^{VI}$ and $R^{VII}$ are equal to or different from each other, and have the same meaning of $R$-$R^V$ except that $R^{VI}$ and $R^{VII}$ cannot be hydrogen. In some embodiments, one or more of the $R$-$R^{VII}$ groups are linked to form a cycle. In some embodiments, the 1,3-diethers have $R^{VI}$ and $R^{VII}$ selected from $C_1$-$C_4$ alkyl radicals.

In some embodiments, the electron donor compound is selected from the group consisting of alkyl and aryl esters of optionally substituted aromatic polycarboxylic acids, esters of malonic acids, esters of glutaric acids, esters of maleic acids, esters of succinic acids, diol derivatives chosen from dicarbamates, monoesters monocarbamates and monoesters monocarbonates, and 1,3-diethers of the formula (I). In some embodiments, mixtures of the donors are used. In some embodiments, the mixtures are made from or contain esters of succinic acids and 1,3-diethers as described in Patent Cooperation Treaty Publication No. WO2011/061134.

In some embodiments, the final amount of electron donor compound in the solid catalyst component ranges from 0.5 to 40 wt % by weight, alternatively from 1 to 25 wt %, with respect to the total weight of the solid catalyst component.

In some embodiments, the solid catalyst component shows a surface area (as determined by the Brunauer-Emmett-Teller (B.E.T.) method) ranging between 20 and 500 m$^2$/g, alternatively between 50 and 400 m$^2$/g, and a total porosity (as determined by the B.E.T. method) greater than 0.2 cm$^3$/g, alternatively between 0.3 and 0.6 cm$^3$/g. In some embodiments, the porosity (Hg method) due to pores with radius up to 1 μm, ranges from 0.3 to 1.5 cm$^3$/g, alternatively from 0.45 to 1 cm$^3$/g.

In some embodiments, the solid catalyst component has an average particle size ranging from 5 to 120 μm, alternatively from 10 to 100 μm.

The solid catalyst component is converted into catalyst for the polymerization of olefins by reacting the solid catalyst component with organoaluminum compounds.

In some embodiments, the organoaluminum compound is a trialkyl aluminum compound. In some embodiments, the trialkyl aluminum compound is selected from the group consisting of triethylaluminum, triisobutylaluminum, tri-n-butylaluminum, tri-n-hexylaluminum, and tri-n-octylaluminum. In some embodiments, the organoaluminum compound is selected from the group consisting of alkylaluminum halides, alkylaluminum hydrides, alkylaluminum sesquichlorides, and mixtures thereof with trialkylaluminums. In some embodiments, the alkylaluminum sesquichlorides are selected from the group consisting of AlEt$_2$Cl and Al$_2$Et$_3$Cl$_3$.

In some embodiments, the Al/Ti ratio is greater than 1, alternatively in the range from 50 to 2000, alternatively from 50 to 500.

In some embodiments, an external electron-donor compound is used. In some embodiments, the external electron-donor compound is selected from the group consisting of silicon compounds, ethers, esters, amines, heterocyclic compounds, and ketones. In some embodiments, the external electron-donor compound is 2,2,6,6-tetramethyl piperidine. In some embodiments, the external donor compounds are silicon compounds of the formula (R$^6$)$_a$(R$^7$)$_b$Si(OR$^8$)$_c$, where a and b are integers from 0 to 2, c is an integer from 1 to 4 and the sum of (a+b+c) is 4; and R$^6$, R$^7$, and R$^8$, are alkyl, cycloalkyl or aryl radicals with 1-18 carbon atoms optionally containing heteroatoms. In some embodiments, the silicon compounds have the values where a is 1, b is 1, and c is 2, at least one of R$^6$ and R$^7$ is selected from branched alkyl, cycloalkyl or aryl groups with 3-10 carbon atoms optionally containing heteroatoms, and R$^8$ is a C$_1$-C$_{10}$ alkyl group. In some embodiments, R$^8$ is a methyl group. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, and methyl(3,3,3-trifluoro-n-propyl)dimethoxysilane. In some embodiments, the silicon compounds have the values where a is 0 and c is 3, R$^7$ is a branched alkyl or cycloalkyl group, optionally containing heteroatoms. In some embodiments, R$^8$ is methyl. In some embodiments, the silicon compounds are selected from the group consisting of cyclohexyltrimethoxysilane, t-butyltrimethoxysilane, and thexyltrimethoxysilane.

In some embodiments, the external electron donor compound is used in such an amount to give a molar ratio between the organoaluminum compound and the external electron donor compound of from 0.1 to 500, alternatively from 1 to 300, alternatively from 3 to 100.

In some embodiments, the catalyst is used in a process for the homopolymerization or copolymerization of CH$_2$=CHR olefins, wherein R is hydrogen or a hydrocarbyl radical with 1-12 carbon atoms.

In some embodiments, the polymerization process is slurry polymerization using an inert hydrocarbon solvent as a diluent, or bulk polymerization using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the polymerization is carried out at a temperature of from 20 to 120° C., alternatively from 40 to 80° C. In some embodiments, the polymerization is carried out in gas-phase with the operating pressure between 0.5 and 5 MPa, alternatively between 1 and 4 MPa. In some embodiments, the polymerization is bulk polymerization with the operating pressure between 1 and 8 MPa, alternatively between 1.5 and 5 MPa.

The following examples are given in order to better illustrate the disclosure without limiting it.

EXAMPLES

Determination of Mg, Ti

The determination of Mg and Ti content in the solid catalyst component was carried out via inductively coupled plasma (ICP) emission spectroscopy on "I.C.P Spectrometer ARL Accuris".

The sample was prepared by analytically weighing, in a "Fluxy" platinum crucible, 0.1 to 0.3 grams of catalyst and 2 grams of lithium metaborate/tetraborate (1/1 mixture). After addition of some drops of potassium iodide (KI) solution, the crucible was inserted in a "Claisse Fluxy" apparatus for complete burning. The residue was collected with a 5% v/v HNO$_3$ solution and then analyzed via ICP at the following wavelengths: magnesium, 279.08 nm; titanium, 368.52 nm.

Determination of Internal Electron Donor Content

The content of internal donor in the solid catalytic compound was determined by gas chromatography. The solid component was dissolved in acetone, an internal reference was added, and a sample of the organic phase was analyzed in a gas chromatograph, thereby determining the amount of donor present at the starting catalyst compound.

Determination of X.I.

2.5 g of polymer and 250 ml of o-xylene were placed in a round-bottomed flask equipped with a cooler and a reflux condenser and kept under nitrogen. The resulting mixture was heated to 135° C. and kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of the xylene-soluble fraction is expressed as a percentage of the original 2.5 grams and then, by difference, the xylene insolubility percentage (X.I. %).

Determination of Bulk Density (BDP)

Determined using DIN-53194.

Melt Flow Rate (MIL)

The melt flow rate (MIL) of the polymer was determined according to ISO 1133 (230° C., 2.16 Kg).

Average Particle Size

Determined by optical diffraction of monochromatic laser light with the "Malvern Instruments 2000" apparatus. The average size is given as P50. P10 and P90 are also determined with this method.

The Malvern Mastersizer 2000 particle size analyzer is divided into three units:

1) an optical unit; Optical core unit for measurements of solids of sizes ranging from 0.02 to 2000μ, equipped with two laser beam sources: red He/Ne laser, power 5 mw, wave length 633 nm., blue (diode) laser, wave length 450 nm.
2) a sampling unit; Hidro 2000S automatic Sampling Unit for volumes between 50 and 120 ml, operating with internal capacity, centrifuge pump, stirrer and ultrasound probe with 40 W power output.
3) a PC console; Portable LG Pentium series, using Malvern Professional software for Windows 2000 or NT. Method of data elaboration using Mie optics theory (Refractive Index for sample=1.596; Refractive Index for n-heptane=1.39).

Method Description

N-heptane (plus 2 g/l antistatic Span 80) was used as dispersing agent.

The measuring cell was loaded with dispersing agent while pump/agitator speed was set up to 2205 RPM. Background measurement was taken. is the sample was loaded using a dedicated loading means for solids or slurries. Before particle size determination, the sample underwent 30 seconds of ultrasound treatment.

General Procedure for the Polymerization of Propylene for Catalyst Containing 9,9-Bis(Methoxymethyl)Fluorene A 4-liter steel autoclave equipped with a stirrer, pressure gauge, thermometer, catalyst feeding system, monomer feeding lines and thermostatic jacket, was purged with a nitrogen flow at 70° C. for one hour. A suspension containing 75 ml of anhydrous hexane, 0.6 g of triethyl aluminum (AlEt$_3$, 5.3 mmol) and 0.006 to 0.010 g of solid catalyst component, previously precontacted for 5 minutes with 10 wt % of total AlEt$_3$, was charged. The autoclave was closed, and hydrogen was added (1250 cc). Under stirring, 1.2 kg of liquid propylene was fed. The temperature was raised to 70° C. in about 10 minutes, and the polymerization was carried out at this temperature for 2 hours. At the end of the polymerization, the non-reacted propylene was removed. The polymer was recovered and dried at 70° C. under vacuum for 3 hours. The resulting polymer was weighed and characterized.

General Procedure for the Polymerization of Propylene for Catalyst Containing Di-Isobutyl Phthalate A 4-liter steel autoclave equipped with a stirrer, pressure gauge, thermometer, catalyst feeding system, monomer feeding lines and thermostatic jacket, was purged with a nitrogen flow at 70° C. for one hour. A suspension containing 75 ml of anhydrous hexane, 0.76 g of AlEt$_3$ (6.66 mmol), 0.33 mmol of cyclohexylmethyldimethoxysilane as an external electron donor, and 0.006 to 0.010 g of solid catalyst component, previously precontacted for 5 minutes, was charged. The autoclave was closed, and hydrogen was added (2000 cm$^3$). Under stirring, 1.2 kg of liquid propylene was fed. The temperature was raised to 70° C. in about 10 minutes, and the polymerization was carried out at this temperature for 2 hours. At the end of the polymerization, the non-reacted propylene was removed. The polymer was recovered and dried at 70° C. under vacuum for 3 hours. The resulting polymer was weighed and characterized.

General Procedure for the Preparation of MgCl$_2$.(EtOH)$_m$ Adducts.

An initial amount of microspheroidal MgCl$_2$.2.8C$_2$H$_5$OH was prepared according to the method described in Example 2 of U.S. Pat. No. 4,399,054. The resulting adduct had an average particle size of 25 μm.

Example 1

Preparation of a 9,9-bis(methoxymethyl)fluorene containing solid catalyst component: Into a 2.0 L round bottom glass reactor, equipped with mechanical stirrer, cooler and thermometer, 1.0 L of TiCl4 was introduced at room temperature under a nitrogen atmosphere. After cooling to −5° C., while stirring, 50 g of microspherical complex of MgCl$_2$ and EtOH were introduced. 0.5 g of Celite™ 577 fine diatomaceous earth having P50 of 22.4 μm were added into the reactor. Celite™ 577 fine diatomaceous earth was commercially available from Sigma Aldrich. The temperature was raised from −5° C. up to 40° C. When this temperature was reached, 9,9-bis(methoxymethyl)fluorene, used as an internal electron donor, was introduced in such an amount to produce a Mg/9,9-bis(methoxymethyl)fluorene molar ratio of 20.

At the end of the addition, the temperature was increased up to 100° C. and maintained for 30 minutes. Stirring was stopped, and the solid product was allowed to settle for a fixed time of 7 minutes. The supernatant liquid was siphoned off, leaving a fixed residual volume in the reactor of 300 cm$^3$ while maintaining the temperature at 75° C. After the supernatant was removed, fresh TiCl$_4$ and 9,9-bis (methoxymethyl)fluorene were added to restore 1 L of total volume and keep a Mg/9,9-bis(methoxymethyl)fluorene molar ratio of 5. The slurry mixture was heated at 109° C. and maintained for 30 minutes. The stirring was interrupted; the solid product was allowed to settle. The supernatant liquid was siphoned off while maintaining the temperature at 109° C. Sedimentation time and slurry suspension residual volume were fixed at 7 minutes and 300 cm$^3$, respectively. A third treatment in fresh TiCl$_4$ (1 L of total volume) was repeated, keeping the mixture under agitation at 109° C. for 15 minutes. The supernatant liquid was siphoned off. Sedimentation time and slurry suspension residual volume were fixed at 7 minutes and 300 cm$^3$, respectively.

The solid was washed with anhydrous i-hexane five times (5×1.0 L) at 50° C. and one time (1.01) at room temperature. During the i-hexane washings, the sedimentation time was fixed, as was the volume of liquid that was siphoned off in each step.

The solid was dried under vacuum, weighed and analyzed.

Catalyst composition: Mg=12.5 wt %; Ti=3.7 wt %; I.D.=20.7 wt %; P50=30 μm.

Based on a mass balance calculation, 93 wt % of initial magnesium was recovered.

Example 2

The same procedure as in Example 1 was carried out with the exception that 0.3 g of Celite™ 577 fine diatomaceous earth was added into the reactor.

Catalyst composition: Mg=11.9 wt %; Ti=3.7 wt %; I.D.=19.5 wt %; P50=28 μm. Based on a mass balance calculation, 84 wt % of initial magnesium was recovered.

Comparative Example 3

The same procedure as in Example 1 was carried out with the exception that Celite™ 577 fine diatomaceous earth was not added into the reactor.

Catalyst composition: Mg=12.8 wt %; Ti=3.8 wt %; I.D.=20.4 wt %; P50=33 μm. Based on a mass balance calculation, 59 wt % of initial magnesium was recovered.

Example 4

The catalysts containing 9,9-bis(methoxymethyl)fluorene as an internal electron donor obtained in the Examples 1 and 2 and Comparative Example 3 were tested in bulk polymerization. Results are reported in Table 1.

TABLE 1

| Example | ACTIVITY Kg/g | XI (%) | MIL g/10' | BDP (g/cm$^3$) |
|---|---|---|---|---|
| 1 | 86 | 97.6 | 5.1 | 0.486 |
| 2 | 86 | 97.7 | 5.0 | 0.432 |
| Comp. 3 | 85 | 97.9 | 4.9 | 0.460 |

Example 5

Into a 0.5 L round bottom jacketed glass reactor, equipped with a mechanical stirrer, cooler circuit and a thermometer, 250 cm$^3$ of TiCl$_4$ were introduced at room temperature under a nitrogen atmosphere. After cooling to −0° C., under stirring, 13.5 g of microspherical MgCl$_2$-EtOH adduct were prepared wherein the EtOH content was lowered to about 45 wt % by dealcoholation in a nitrogen flow.

0.135 g of Celite™ 577 fine diatomaceous earth were added to the slurry. The temperature was raised from −0° C. up to 40° C. in about 20 min. When the temperature of 40° C. was reached, 9,9-bis(methoxymethyl)fluorene, used as an internal electron donor, was introduced in such an amount to produce a Mg/9,9-bis(methoxymethyl)fluorene molar ratio of 5.

At the end of the addition, the temperature was increased to 100° C. in about 60 min and maintained for 30 minutes under stirring.

The slurry was completely dark.

A lamp was positioned back in the middle of glass reactor. No light was visible in front of the reactor.

Stirring was stopped. Solid product sedimentation time was estimated by observing the appearance of the back light across the dark slurry phase becoming transparent in time. The run was repeated several times to generate a reliable statistical basis. Solid sedimentation was completed in 3 minutes.

Example 6

The same procedure of Example 5 was carried out with the exception that 0.13 g of Gasil AB735 silica (P50 24 μm) was used instead of Celite™ 577 fine diatomaceous earth. Gasil AB735 silica was commercially available from PQ Corporation. The sedimentation time (measured according to Ex. 5) was 3 minutes.

Example 7

The same procedure of Example 5 was carried out with the exception that 0.13 g of talc having P50 of 9 μm was used instead of Celite™ 577 fine diatomaceous earth. The talc was commercially available from Sigma Aldrich as product no. 243604. The sedimentation time (measured according to Ex. 5) was 3 minutes and 15 seconds.

Example 8

The same procedure of Example 5 was repeated with the exception that 0.13 grams of Silica Gasil AB200DF silica having P50 of 8 μm was used instead of Celite™ 577 fine diatomaceous earth. Gasil AB200DF silica was commercially available from PQ Corporation. The sedimentation time (measured according to Ex. 5) was 2 minutes and 15 seconds.

Comparative Example 9

The same procedure of Example 5 was carried out with the exception that 0.14 g of Carboxen 1000 carbon absorbent was used instead of Celite™ 577 fine diatomaceous earth. Carboxen 1000 carbon absorbent was commercially available from Supelco Analytical—Sigma Aldrich. The sedimentation time (measured according to Ex. 5) was 4 minutes and 50 seconds.

Comparative Example 10

The same procedure of Example 5 was carried out with the exception that no additive was loaded after the internal donor. The sedimentation time (measured according to Ex. 5) was 4 minutes and 20 seconds.

Example 11: Sedimentation in Hydrocarbon Slurry

Into a 2.0 L round bottom calibrated glass reactor, equipped with a mechanical stirrer, 1.9 L of iso-hexane was introduced at room temperature under a nitrogen atmosphere. A catalyst prepared as described in Comparative Example 3. The catalyst was introduced to have a solid concentration of 41 g/L under stirring. At room temperature, the catalyst slurry in hydrocarbon was agitated at 350 rpm for 10 minutes. The stirrer was stopped. The black solid settled, leaving a clear solvent on the upper part.

The front of the solid moved towards the bottom of the reactor. The sedimentation rate was estimated by measuring the distance covered by the spherical catalyst over time. An amount of Celite™ 577 fine diatomaceous earth was added to the reactor to yield Celite™ 577:catalyst=1 wt %. The slurry was stirred for 10 minutes. The stirring was stopped. The sedimentation rate was measured. The slurry of catalyst was stirred for an additional 50 minutes. The sedimentation rate measured.

This method was sequentially repeated to evaluate both the effect of the amount of Celite™ 577 fine diatomaceous earth and the mixing time with respect to the sedimentation rate. The results are reported in Table 2, where the mixing time refers to the total mixing time at the specific amount of sedimentation aid.

Example 12

The same procedure of Example 11 was repeated with the exception that talc was used instead of Celite™ 577 fine diatomaceous earth (same weight percent ratio). The talc was commercially available from Sigma Aldrich as product no. 243604. The results are reported in Table 2.

Example 13

The same procedure of Example 11 was repeated with the exception that HDK® T30 hydrophilic pyrogenic silica having P50 of 23 µm, was used instead of Celite™ 577 fine diatomaceous earth (same weight percent ratio). HDK® T30 hydrophilic pyrogenic silica was commercially available from Wacker Silicones. The results are reported in Table 2.

Example 14

The same procedure of Example 11 was repeated with the exception that Silica Fluka having P50 of 4 µm was used instead of Celite™ 577 fine diatomaceous earth (same weight percent ratio). Silica Fluka was commercially available from Sigma Aldrich as product no. S5631. The results are reported in Table 2.

Example 15

The same procedure of Example 11 was repeated with the exception that Gasil AB735 silica was used instead of Celite™ 577 fine diatomaceous earth (same weight percent ratio). Gasil AB735 silica was commercially available from PQ Corporation. The results are reported in Table 2.

Example 16

The same procedure of Example 11 was repeated with the exception that Gasil AB200DF silica was used instead of Celite™ 577 fine diatomaceous earth (same weight percent ratio). Gasil AB200DF silica was commercially available from PQ Corporation. The results are reported in Table 2.

Comparative Example 17

The same procedure of Example 11 was repeated with the exception that graphite was used instead of Celite™ 577 fine diatomaceous earth (same weight percent ratio). The graphite was commercially available from Sigma Aldrich as product no. 282863. The results are reported in Table 2.

Comparative Example 18

The same procedure of Example 11 was repeated with the exception that CaF2 was used instead of Celite™ 577 fine diatomaceous earth (same weight percent ratio). The CaF2 was commercially available from Sigma Aldrich as product no. 449717. The results are reported in Table 2.

Comparative Example 19

The same procedure of Example 11 was repeated with the exception that Cu-pthalocyanine was used instead of Celite™ 577 fine diatomaceous earth (same weight percent ratio). The Cu-pthalocyanine was commercially available from Sigma Aldrich as product no. 546682. The results are reported in Table 2.

Comparative Example 20

The same procedure of Example 11 was repeated with the exception that zirconium hydrogen phosphate was used instead of Celite™ 577 fine diatomaceous earth (same weight percent ratio). The zirconium hydrogen phosphate was commercially available from Sunshine Factory Co., Ltd. The results are reported in Table 2.

Comparative Example 21

The same procedure of Example 11 was repeated except without additional compounds. The results are reported in Table 2.

TABLE 2

| Example | Additive (wt %) | Mixing time (min) | Sed. Rate (cm/min) |
|---|---|---|---|
| 11 | None | 10 | 10 |
| 11 | Celite577 (1%) | 10 | 30 |
| 11 | Celite577 (1%) | 60 | 35 |
| 11 | Celite577 (2%) | 10 | 40 |
| 12 | None | 10 | 10 |
| 12 | Talc (1%) | 10 | 10 |
| 12 | Talc (1%) | 60 | 26 |
| 12 | Talc (2%) | 10 | 44 |
| 13 | None | 10 | 9 |
| 13 | Silica T30 (0.5%) | 10 | 18 |
| 13 | Silica T30 (0.5%) | 60 | 22 |
| 13 | Silica T30 (1%) | 10 | 20 |
| 13 | Silica T30 (1%) | 60 | 22 |
| 13 | Silica T30 (1.5%) | 10 | 22 |
| 13 | Silica T30 (1.5%) | 60 | 37 |
| 13 | Silica T30 (2%) | 10 | 55 |
| 13 | Silica T30 (2%) | 60 | 55 |
| 14 | None | 10 | 9 |
| 14 | Silica Fluka (0.5%) | 10 | 29 |
| 14 | Silica Fluka (0.5%) | 60 | 36 |
| 14 | Silica Fluka (1%) | 10 | 48 |
| 14 | Silica Fluka (1%) | 60 | 47 |
| 14 | Silica Fluka (1.5%) | 10 | 50 |
| 14 | Silica Fluka (1.5%) | 60 | 47 |
| 15 | None | 10 | 10 |
| 15 | Silica AB735 (0.5%) | 10 | 16 |
| 15 | Silica AB735 (0.5%) | 60 | 48 |
| 15 | Silica AB735 (1%) | 10 | 51 |
| 15 | Silica AB735 (1%) | 60 | 48 |
| 15 | Silica AB735 (1.5%) | 10 | 48 |
| 15 | Silica AB735 (1.5%) | 60 | 43 |
| 15 | Silica AB735 (2%) | 10 | 39 |
| 16 | None | 10 | 10 |
| 16 | Silica AB200DF (0.5%) | 10 | 10 |
| 16 | Silica AB200DF (0.5%) | 60 | 15 |
| 16 | Silica AB200DF (1%) | 10 | 29 |
| 16 | Silica AB200DF (1%) | 60 | 44 |
| 16 | Silica AB200DF (1.5%) | 10 | 50 |
| 16 | Silica AB200DF | 60 | 50 |

TABLE 2-continued

| Example | Additive (wt %) | Mixing time (min) | Sed. Rate (cm/min) |
|---|---|---|---|
| 16 | Silica AB200DF (1.5%) | 10 | 55 |
| 16 | Silica AB200DF (2%) | 60 | 55 |
| Comp. EX17 | None | 10 | 9 |
| Comp. EX17 | Graphite (0.5%) | 10 | 18 |
| Comp. EX17 | Graphite (0.5%) | 60 | 18 |
| Comp. EX17 | Graphite (1%) | 10 | 20 |
| Comp. EX17 | Graphite (1%) | 60 | 16 |
| Comp. EX17 | Graphite (1.5%) | 10 | 12 |
| Comp. EX17 | Graphite (1.5%) | 60 | 15 |
| Comp. EX17 | Graphite (2%) | 10 | 15 |
| Comp. EX17 | Graphite (2%) | 60 | 13 |
| Comp. EX18 | None | 10 | 10 |
| Comp. EX18 | $CaF_2$ (0.5%) | 10 | 12 |
| Comp. EX18 | $CaF_2$ (0.5%) | 60 | 21 |
| Comp. EX18 | $CaF_2$ (1%) | 10 | 18 |
| Comp. EX18 | $CaF_2$ (1%) | 60 | 19 |
| Comp. EX18 | $CaF_2$ (1.5%) | 10 | 15 |
| Comp. EX18 | $CaF_2$ (1.5%) | 60 | 14 |
| Comp. EX18 | $CaF_2$ (2%) | 10 | 15 |
| Comp. EX18 | $CaF_2$ (2%) | 60 | 12 |
| Comp. EX19 | None | 10 | 9 |
| Comp. EX19 | Cu-Phthalc. (0.5%) | 10 | 12 |
| Comp. EX19 | Cu-Phthalc. (0.5%) | 60 | 21 |
| Comp. EX19 | Cu-Phthalc. (1%) | 10 | 21 |
| Comp. EX19 | Cu-Phthalc. (1%) | 60 | 21 |
| Comp. EX19 | Cu-Phthalc. (1.5%) | 10 | 21 |
| Comp. EX19 | Cu-Phthalc. (1.5%) | 60 | 20 |
| Comp. EX19 | Cu-Phthalc. (2%) | 10 | 20 |
| Comp. EX19 | Cu-Phthalc. (2%) | 60 | 21 |
| Comp. EX20 | None | 10 | 9 |
| Comp. EX20 | $Zr(HPO_4)_2$ (0.5%) | 10 | 11 |
| Comp. EX20 | $Zr(HPO_4)_2$ (0.5%) | 60 | 15 |
| Comp. EX20 | $Zr(HPO_4)_2$ (1%) | 10 | 13 |
| Comp. EX20 | $Zr(HPO_4)_2$ (1%) | 60 | 18 |
| Comp. EX20 | $Zr(HPO_4)_2$ (1.5%) | 10 | 21 |
| Comp. EX20 | $Zr(HPO_4)_2$ (1.5%) | 60 | 25 |
| Comp. EX20 | $Zr(HPO_4)_2$ (2%) | 10 | 26 |
| Comp. EX20 | $Zr(HPO_4)_2$ (2%) | 60 | 26 |
| Comp. EX21 | None | 10 | 9 |
| Comp. EX21 | None | 20 | 11 |
| Comp. EX21 | None | 80 | 25 |
| Comp. EX21 | None | 90 | 25 |
| Comp. EX21 | None | 150 | 24 |
| Comp. EX21 | None | 210 | 21 |
| Comp. EX21 | None | 220 | 23 |
| Comp. EX21 | None | 280 | 21 |

Example 22

The catalysts containing 9,9-bis(methoxymethyl)fluorene as an internal electron donor obtained in the Examples 11 to 16 and Comparative Examples 17 to 21 were tested in bulk polymerization. The results are reported in Table 3.

TABLE 3

| Example | Additive (wt %) | Activity Kg/g | XI (%) | MIL | BDP (g/cc) |
|---|---|---|---|---|---|
| 11 | None | 99 | 96.5 | 6.0 | 0.488 |
| 11 | Celite577 (2%) | 92 | 96.6 | 4.1 | 0.503 |
| 12 | Talc (2%) | 87 | 96.9 | 5.4 | 0.487 |
| 13 | Silica T30 (2%) | 99 | 96.3 | 4.9 | 0.502 |
| 14 | Silica Fluka (1.5%) | 99 | 96.2 | 5.2 | 0.493 |
| 15 | Silica AB735 (2%) | 87 | 96.9 | 6.8 | 0.512 |
| 16 | Silica AB200DF (2%) | 82 | 97.0 | 3.6 | 0.505 |
| Comp. 19 | Cu-Phthalc. (2%) | 90 | 96.9 | 6 | 0.499 |
| Comp. 20 | $Zr(HPO_4)_2$ (2%) | 95 | 96.8 | 5.8 | 0.503 |
| Comp. 21 | none | 95 | 97.0 | 6.4 | 0.493 |

Example 23

Into a 0.5 L round bottom jacketed glass reactor, equipped with a mechanical stirrer, cooler circuit and a thermometer, 250 cm³ of $TiCl_4$ were introduced at room temperature under a nitrogen atmosphere. After cooling at −0° C., under stirring, 16 g of microspherical $MgCl_2$-EtOH adduct were introduced.

0.175 g of Celite™ 577 fine diatomaceous earth were added to the slurry. Keeping the same temperature under stirring, 2.5 g of di-isobutyl phthalate for use as an internal electron donor were introduced (Mg/diisobutyl phthalate=8.0 molar).

At the end of the addition, the temperature was increased to 100° C. in about 60 min and maintained for 60 minutes under stirring.

The slurry in was a homogeneous, yellowish color.

A lamp was positioned in the middle back of the glass reactor.

Stirring was stopped. Solid product sedimentation time was estimated by observing the solid level increasing on the bottom of the reactor as well as the appearance of the liquid phase, which became progressively less hazy over time. Solid sedimentation was completed in 2 minutes and 15 seconds. The liquid was discharged from the bottom of the glass reactor using a flat filter. Fresh TiCl4 was added to restore the initial concentration. The slurry mixture was heated to 120° C. and maintained for 60 minutes. The stirring was interrupted. The solid product was separated by the liquid filtering the suspension while maintaining the temperature at 120° C. A third treatment of fresh TiCl4 was used, keeping the mixture under agitation at 120° C. for 30 minutes, and then the liquid was filtered off. The solid was washed with anhydrous i-hexane five times (5×0.250 L) at 50° C. and one time at room temperature.

The solid was dried under vacuum, weighed and analyzed.

Catalyst composition: Mg=17.3 wt %; Ti=3.3 wt %; I.D.=12.3 wt %; P50=28 μm.

Example 24

The same procedure of Example 23 was carried out with the exception that Fluka silica was used instead of Celite™ 577 fine diatomaceous earth. Silica Fluka was commercially available from Sigma Aldrich as product no. 55631. The sedimentation time was 2 minutes and 45 seconds.

Comparative Example 25

The same procedure of Example 23 was repeated except without the addition of any further compounds. The sedimentation time was more than 4 minutes.

Example 26

The catalysts based on diisobutylphthalate as an internal electron donor obtained in Examples 23, 24 and Comparative Example 25 were tested in bulk polymerization. The results are reported in Table 4.

TABLE 4

| Example | ACTIVITY Kg/g | XI (%) | MIL |
|---|---|---|---|
| 23 | 74 | 96.8 | 10.4 |
| 24 | 76 | 96.6 | 14.7 |
| Comp. ex. 25 | 77 | 96.9 | 11.5 |

Example 27: Sedimentation in Hydrocarbon Slurry

The same procedure of Example 11 was repeated with the exception that the Ziegler-Nana catalyst was prepared as described in Example 2 of U.S. Pat. No. 6,127,304. The results are reported in Table 5.

Example 28

The same procedure of Example 11 was repeated with the exception that talc was used instead of Celite™ 577 fine diatomaceous earth (same weight percent ratio). The talc was commercially available from Sigma Aldrich as product no. 243604. The results are reported in Table 5.

Example 29

The same procedure of Example 11 was repeated with the exception that Gasil AB200DF silica was used instead of Celite™ 577 fine diatomaceous earth (same weight percent ratio). Gasil AB200DF silica was commercially available from PQ Corporation. The results are reported in Table 5.

Example 30

The same procedure of Example 11 was repeated with the exception that Gasil AB735 silica was used instead of Celite™ 577 fine diatomaceous earth (same weight percent ratio). Gasil AB735 silica was commercially available from PQ Corporation. The results are reported in Table 5.

Example 31

The same procedure of Example 11 was repeated with the exception that Silica Fluka was used instead of Celite™ 577 fine diatomaceous earth (same weight percent ratio). Silica Fluka was commercially available from Sigma Aldrich as product no. S5631. The results are reported in Table 5.

TABLE 5

| Example (#) | Additive (wt %) | Mixing time (min) | Sed. Rate (cm/min) |
|---|---|---|---|
| 27 | None | 10 | 20 |
| 27 | Celite577 (1%) | 10 | 30 |
| 27 | Celite577 (1%) | 60 | 33 |
| 27 | Celite577 (1.5%) | 10 | 30 |
| 27 | Celite577 (1.5%) | 60 | 34 |
| 27 | Celite577 (2%) | 10 | 35 |
| 27 | Celite577 (2%) | 60 | 35 |
| 28 | None | 10 | 19 |
| 28 | Talc (1%) | 10 | 25 |
| 28 | Talc (1%) | 60 | 30 |
| 28 | Talc (1.5%) | 10 | 30 |
| 28 | Talc (1.5%) | 60 | 32 |
| 28 | Talc (2%) | 10 | 32 |
| 28 | Talc (2%) | 60 | 33 |
| 29 | None | 10 | 16 |
| 29 | Silica AB200DF (1%) | 10 | 33 |
| 29 | Silica AB200DF (1%) | 60 | 36 |
| 29 | Silica AB200DF (1.5%) | 10 | 36 |
| 29 | Silica AB200DF (1.5%) | 60 | 36 |
| 29 | Silica AB200DF (2%) | 10 | 36 |
| 29 | Silica AB200DF (2%) | 60 | 36 |
| 30 | None | 10 | 18 |
| 30 | Silica AB735 (1%) | 10 | 29 |
| 30 | Silica AB735 (1%) | 60 | 29 |
| 30 | Silica AB735 (1.5%) | 10 | 29 |
| 30 | Silica AB735 (1.5%) | 60 | 26 |
| 30 | Silica AB735 (2%) | 10 | 25 |
| 30 | Silica AB735 (2%) | 60 | 25 |
| 31 | none | 10 | 17 |
| 31 | Silica Fluka (1%) | 10 | 30 |
| 31 | Silica Fluka (1%) | 60 | 35 |
| 31 | Silica | 10 | 32 |

TABLE 5-continued

| Example (#) | Additive (wt %) | Mixing time (min) | Sed. Rate (cm/min) |
|---|---|---|---|
| 31 | Fluka (1.5%) Silica | 60 | 36 |
| 31 | Fluka (1.5%) Silica | 10 | 36 |
| 31 | Fluka (2%) Silica | 60 | 38 |
| | Fluka (2%) | | |

Example 32

The catalysts based on diisobutylphthalate as an internal electron donor obtained in Examples 27 to 31 were tested in bulk polymerization. The results are reported in Table 6 and are compared with the neat catalyst without any treatment in iso-hexane.

TABLE 6

| Example | Additive (wt %) | ACTIVITY Kg/g | XI (%) | MIL |
|---|---|---|---|---|
| 27 | Celite577 (2%) | 63 | 97.9 | 6.5 |
| 29 | Silica AB200DF (2%) | 61 | 97.9 | 6.6 |
| 30 | Silica AB735 (2%) | 48 | 97.7 | 7.5 |
| 31 | Silica Fluka (2%) | 65 | 97.7 | 9.5 |
| 32 | None | 68 | 97.8 | 7.0 |

What is claimed is:

1. A process for the preparation of a solid catalyst component for the homopolymerization or copolymerization of $CH_2$=CHR olefins, wherein R is hydrogen or hydrocarbyl radical with 1-12 carbon atoms, comprising a Ti compound and optionally an electron donor on a Mg chloride based support, comprising the steps of:
   (a) reacting a Mg based compound of formula ($MgCl_mX_{2-m}$)·nLB, wherein m ranges from 0 to 2, n ranges from 0 to 6, X is, independently halogen, $R^1$, $OR^1$, —$OCOR^1$ or O—C(O)—$OR^1$ group, wherein $R^1$ is a $C_1$-$C_{20}$ hydrocarbon group, and LB is a Lewis base, with a liquid medium comprising a Ti compound, having at least a Ti—Cl bond, in an amount such that the Ti/Mg molar ratio is greater than 3, carried out at a temperature ranging from 0 to 150° C., thereby yielding solid particles; and
   (b) suspending the solid particles coming from step (a) in a liquid medium comprising a hydrocarbon at a temperature ranging from 10 to 100° C.,
   wherein step (a) or step (b) is carried out in the presence of 0.2 to 20.0% by weight, with respect to the amount of Mg compound, of particles of a solid compound containing more than 50% by weight of $SiO_2$ units and having average particle size ranging from 1 to 100 μm.

2. The process of claim 1, wherein the solid compound containing more than 50% by weight of $SiO_2$ units has average particle size ranging from 1 to 30 μm.

3. The process of claim 1, wherein the solid compound containing more than 50% by weight of $SiO_2$ units is selected from the group consisting of silica, silicates and diatomaceous earth.

4. The process according to claim 1, wherein the solid compound containing more than 50% by weight of $SiO_2$ units is diatomaceous earth.

5. The process according to claim 1, wherein the solid compound containing more than 50% by weight of $SiO_2$ units is talc.

6. The process according to claim 1, wherein the amount of solid compound containing more than 50% by weight of $SiO_2$ units ranges from 0.5 to 10% by weight with respect to the amount of Mg compound in step (a).

7. The process according to claim 1, wherein the Mg based compound in step (a) is selected among adducts of the formula $MgCl_2$·$nR^1OH$, where n is a number between 0.1 and 6, and $R^1$ is a hydrocarbon radical having 1-18 carbon atoms.

8. The process according to claim 7, wherein n ranges from 1 to 5 and $R^1$ is ethyl.

9. The process according to claim 1, wherein the reaction temperature is from 60 to 140° C.

10. The process of claim 1, wherein the number of steps (a) is between 1 and 4.

11. The process of claim 1, wherein the solid compound containing more than 50% by weight of $SiO_2$ units is present in step (a).

12. The process of claim 1, wherein the components present during reaction step (a) further comprise an internal electron donor compound selected from the group consisting of alkyl and aryl esters of optionally substituted aromatic polycarboxylic acids, esters of malonic acids, esters of glutaric acids, esters of maleic acids, esters of succinic acids, diol derivatives chosen from dicarbamates, monoesters monocarbamates and monoesters monocarbonates, and 1,3-diethers of the formula:

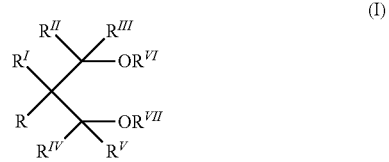

wherein R, $R^I$, $R^{II}$, $R^{III}$, $R^{IV}$ and $R^V$ are the same or different from each other, and are hydrogen or hydrocarbon radicals having from 1 to 18 carbon atoms, and $R^{VI}$ and $R^{VII}$ are the same or different from each other, and have the same meaning of R-$R^V$ except that $R^{VI}$ and $R^{VII}$ are not hydrogen.

13. The process according to claim 12, wherein the internal donor is introduced to the liquid medium in at least a first step (a).

14. The process according to claim 1, wherein the solid compound containing more than 50% by weight of $SiO_2$ units is added in step (b).

15. The process of claim 14, wherein the solid compound containing more than 50% by weight of $SiO_2$ units is diatomaceous earth.

16. The process of claim 12, wherein one or more of the R-$R^{VII}$ groups are linked to form a cycle.

* * * * *

UNITED STATES PATENT AND TRADEMARK OFFICE
CERTIFICATE OF CORRECTION

| | |
|---|---|
| PATENT NO. | : 11,267,907 B2 |
| APPLICATION NO. | : 16/647766 |
| DATED | : March 8, 2022 |
| INVENTOR(S) | : Brita et al. |

It is certified that error appears in the above-identified patent and that said Letters Patent is hereby corrected as shown below:

In the Specification

In Column 1, Line 4, after "PROCESS FOR THE PREPARATION OF CATALYST COMPONENTS FOR THE POLYMERIZATION OF OLEFINS" insert -- This application is the U.S. National Phase of PCT International Application PCT/EP2018/074086, filed September 7, 2018, claiming benefit of priority to European Patent Application No. 17191417.9, filed September 15, 2017, the contents of which are incorporated herein by reference in its entirety. --

In Column 15, Line 28, delete "55631." and insert -- S5631. --, therefor

In Column 15, Line 57 delete "Ziegler-Nana" and insert -- Ziegler-Natta --, therefor Signed and Sealed this
Ninth Day of January, 2024

Katherine Kelly Vidal
*Director of the United States Patent and Trademark Office*